Jan. 10, 1933. J. F. HAAG 1,893,860
COW PEA HARVESTER
Filed March 12, 1931 3 Sheets-Sheet 2

Inventor
J. F. Haag
By Watson E. Coleman
Attorney

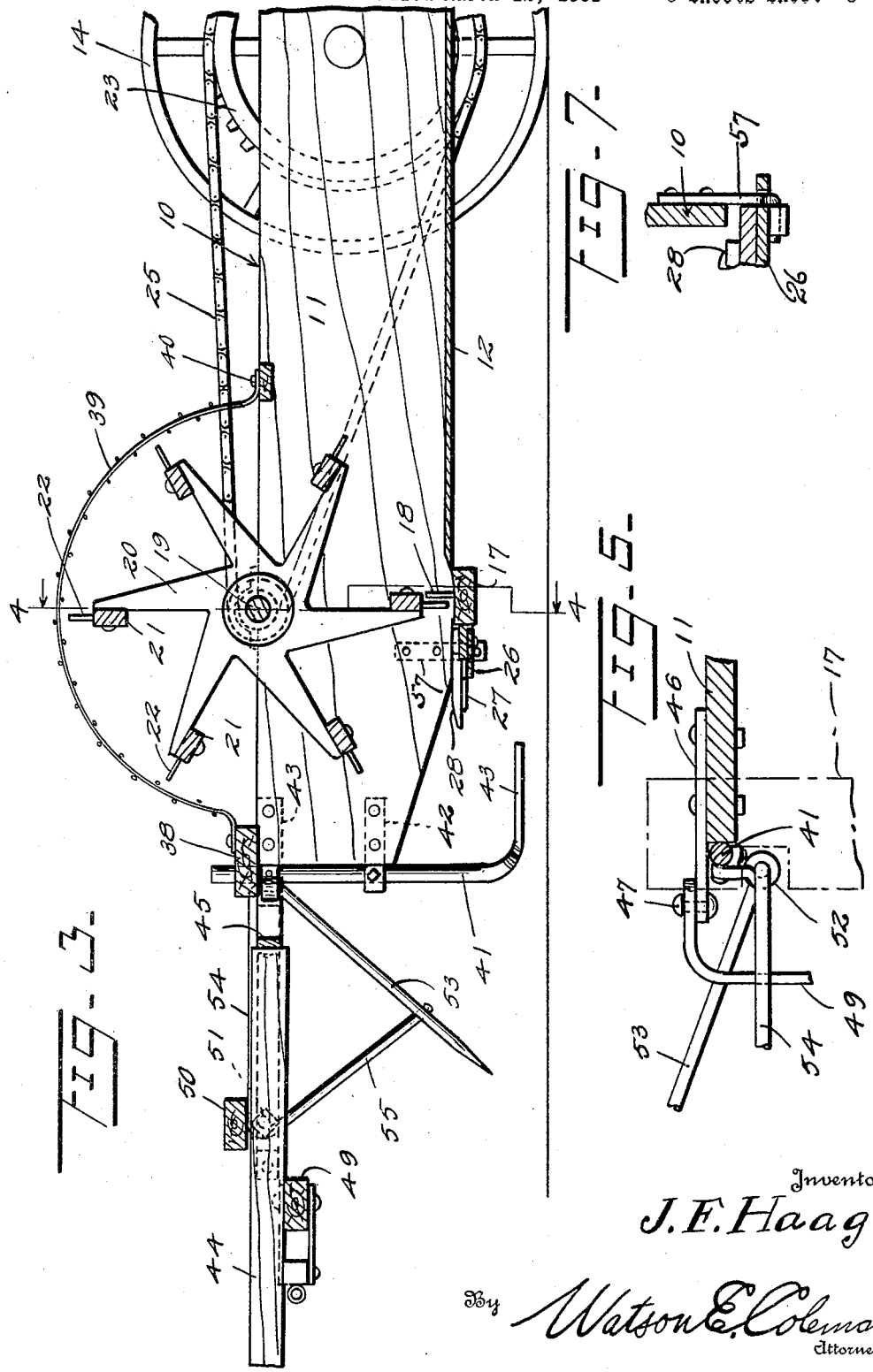

Patented Jan. 10, 1933

1,893,860

UNITED STATES PATENT OFFICE

JOHN F. HAAG, OF WEATHERFORD, OKLAHOMA

COW PEA HARVESTER

Application filed March 12, 1931. Serial No. 522,056.

This invention relates to harvesters and particularly to means for harvesting cow peas or like crop when sewn in rows between other crops. In some sections of the United States, particularly in the middle West, a relatively new method of farming is being employed by which every third row planted to row crops is planted with some legume crop, either peas, soy beans or other plant of the legume family. This is designed to build up the soil. In order to harvest this legume crop when planted with another crop, a machine must be provided which is narrow enough to go between the rows and which will not injure the other crops on each side of the row of peas or soy beans, which will cut the crop economically and practically and which will separate the beans or peas from the vines so that the vines may be afterwards shocked and then scattered upon the land if desired or used for fodder or for other purposes.

The general object of my invention is to provide a machine of this character which will do this work effectively, which is relatively simple, which is so designed that it may be used between the rows of other crops for the purpose of harvesting these legume crops and in which the vines will be beaten so as to detach the beans or peas therefrom and in which the vines will be thrown rearward on to a platform so that the vines after a sufficient amount of vines has been accumulated may be bunched together in quantities sufficient to form a shock and then discharged from the body of the harvester by a hand.

A further object, in this connection, is to provide a machine of this character which is mounted on a pair of wheels and which is so balanced that the farm hand riding in the body of the machine can raise the front end of the machine out of its operating movement with the soil by walking to the rear of the machine, thus permitting the machine to be easily turned at the end of the row.

A further object is to provide a machine of this character with a sickle operating after the manner of the usual sickle on a mowing machine with a beater and concave whereby the vines may be beaten to detach the beans and peas therefrom and whereby the vines may be thrown back into the body of the machine, and into position where they may be gathered together by a farm hand and then discharged from the machine in an amount sufficient to form a shock.

Other objects will appear in the course of the following description.

My invention is illustrated in the accompanying drawings, wherein:—

Figure 3 is a vertical longitudinal section through the forward end of the harvester;

Figure 4 is a section on the line 4—4 of Figure 3;

Figure 5 is a fragmentary detailed section in a horizontal plane through the forward portion of one of the side members and showing in elevation the means for supporting the end of the pick-up member;

Figure 6 is a fragmentary side elevation of the forward end of one of the side boards showing partly in section, the means for supporting the mower bar;

Figure 7 is a fragmentary vertical section through the forward end of the opposite side board to that shown in Figure 6 and showing the means at the opposite end of the mower bar for supporting it, the mower bar and allied parts being shown in section.

Figure 1:
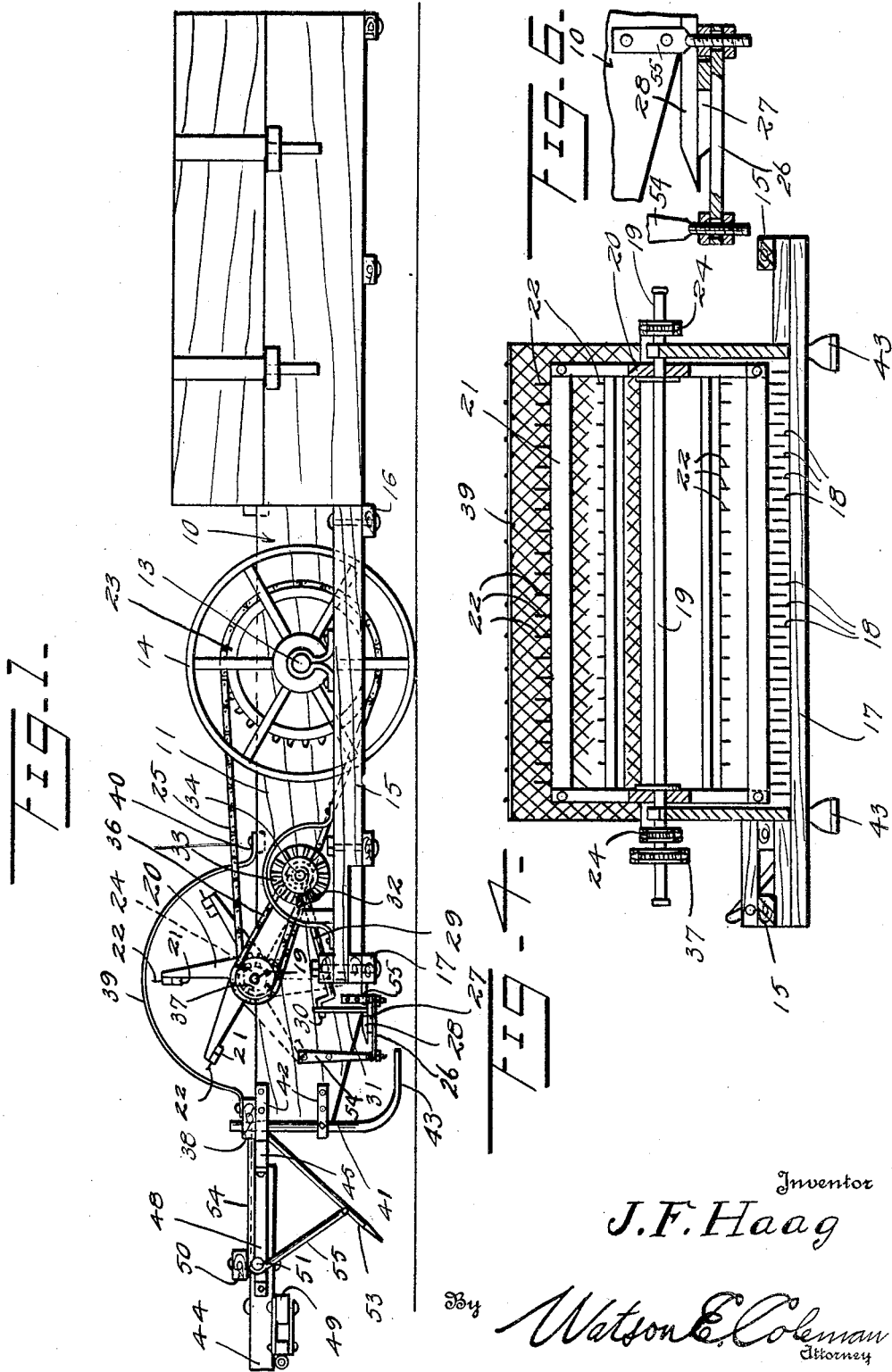
Figure 1 is a side elevation of a harvester constructed in accordance with my invention.

Referring to these drawings, 10 designates generally the body of the machine which includes the bottom 12 and the side boards 11. This body is supported upon transverse stub axles 13 having thereon the traction wheels 14. Each axle is extended beyond the traction wheel and said stub axles are supported by means of the longitudinal members 15 which are inclined rearward and laterally outward and are connected at their rear ends by a transverse beam 16 extending beneath the body and at their forward ends by a transverse beam 17 extending beneath the body. This beam 17 as shown in Figure 3 is provided with upwardly extending teeth 18 upon its upper surface and constitutes a concave. The upper face of this beam may also be slightly concave if desired. The bottom of the body might be made of sheet metal, though I do not wish to be limited thereto.

Disposed above the concave beam 17 is a shaft 19 upon which is mounted a beater comprising end members 20 formed with radially extending arms carrying the transversely extending elements 21 provided with the teeth 22 which coact with the teeth 18 on the concave beam 17. This beater as illustrated is driven from sprocket wheels 23 carried by the traction wheels 14. Sprocket wheels 24 on the beater shaft and wheels 23 are connected by the sprocket chains 25.

Disposed in front of the beam 17 is a sickle 26 of any usual construction having the usual knives 27 operating beneath the fingers 28, the sickle being supported in any suitable manner. The sickle is oscillated by means of a short longitudinally extending shaft 29 operatively supported upon the beam 17, this shaft having a crank 30, one end engaging a connecting rod 31 in turn engaged with the sickle blade.

At its other end, this shaft carries the beveled gear wheel 32 engaged by a beveled gear wheel 33 on a transverse stub shaft 34, this shaft carrying a sprocket wheel 35 over which passes a sprocket chain 36 which engages the sprocket wheel 37 mounted upon the shaft 19. Thus it will be seen that power for reciprocating the sickle will be secured from the traction wheels 14.

Extending across the front ends of the side boards 11 is a transverse beam 38 and attached to this beam and arching up over the beater 20 is a screen 39 whose rear end is attached to a beam 40 mounted upon the side boards and extending transversely across the same. This screen prevents the peas or beans from being discharged outward of the body and the vines from being thrown out.

Mounted for vertical adjustment at the forward ends of the boards 11 are the vertically extending runner shanks 41 supported by the irons 42, these runner shanks at their lower ends being turned horizontally to form runners 43 which in the normal operation of the device travel upon the ground. The tongue 44 is connected to the body by the angular irons 45 which at their outer ends are turned rearwardly as shown particularly in Figure 5 and pivotally connected to irons 46 as at 47. The tongue is braced by the angularly extending braces 48 connected to the tongue and to the irons 45. The tongue carries the usual evener beam 49 and whiffletrees. Mounted upon the tongue is a transverse bar 50. Supported by the ends of the beams 50 are pins 51 and mounted upon these pins and upon eyes 52 and supported at the forward ends of the boards 11 are pick-up members having a generally triangular shape.

Figure 2:
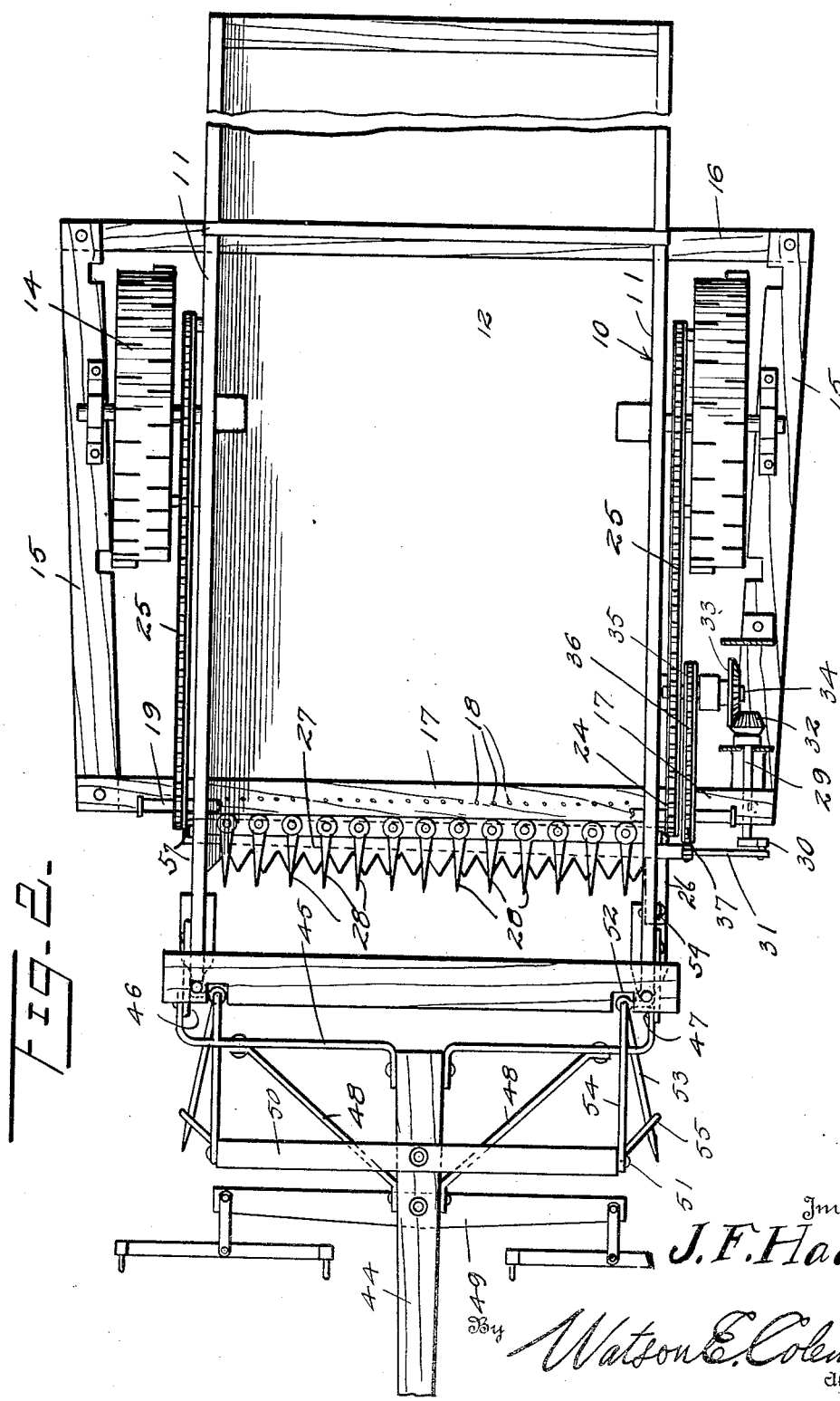
Figure 2 is an enlarged top plan view of the structure shown in Figure 1.

Each pick-up member consists of a single length of rod bent in the general form of a triangle to form a downwardly and forwardly extending portion 53 which extends upward and rearward through the eye 52, then extends forward as at 54 and then downward and rearward as at 55. The downwardly and forwardly extending portion 53 extends beneath the end of the portion 55 and is preferably pointed. As shown in Figure 2, the portion 53 extends downward, forwardly and laterally and acts as a gatherer and pulls outlying plants into the sickle. The pick-up members I regard as very important. In harvesting cow peas, there are many varieties in which the vines are very straggling and long and these vines lie on the ground and it is the work of the pick-up members to pull the vines in and lift them up somewhat so that the sickle can cut them. As the machine moves forward, the vines are pulled within reach of the sickle by means of these pick-up members.

The sickle may be supported in any suitable manner, but preferably the sickle is mounted for tilting movement. The sickle is supported by means of the usual mower bar 26. Such a bar is relatively wide at one end or formed with the forward extension. The wide end of this mower bar is supported by two strap irons designated 54 and 55 (see Figure 6) which strap irons are bolted to the side boards 10 and extend down below the forward ends of these side boards and are formed with screw-threaded shanks at their lower ends. The strap iron 54 has its screw-threaded end extending downward through an opening in the forward extension of the sickle bar while the rear strap iron 55 extends down through the bar adjacent the rear edge thereof. The screw-threaded shanks carry upper and lower bolts between which the mower bar is supported. The opposite end of the bar is supported by a single bolt 57 having an angular shank passing loosely through an opening in the opposite end of the bar. (See Fig. 7.)

By adjusting the nuts on the screw-threaded portions of the several strap irons, the bar may be adjusted to any desired tilt. Where the ground is soft or the soil is very sandy, it is necessary, of course, to have the wheel rims wide or provide lateral extensions for the wheel rims. This will depend entirely upon the character of the ground over which the machine is operating.

In the operation of this construction, the operator stands forward of the axle 13 to thus depress the forward end of the body to bring the runners down on to the ground and the sickle relatively close to the ground. As the machine is drawn along the row of soy beans or other legumes, the vines will be cut off relatively close to the ground and the beaters will draw the vines into the forward end of the body and as the vines are drawn past the concave and pins 18, the vines will be stripped of peas or beans. The vines and the peas or beans will be thrown rearward on to the floor of the body and any vines remaining attached to the beater will be carried around and beaten again so that all the beans and peas will be detached. When a sufficient amount of vines has accumulated within the body, the farm hand tosses the vines out of the rear end of the body. It will be understood, of course, that he allows the vines to accumulate until a sufficient quantity has accumulated to form a shock. Then the vines are thrown out of the body upon the ground. The vines are spread to a certain extent upon the ground to permit them to dry and then are either strewn over the ground or shocked and eventually carried off to the barn.

By mounting the body upon two wheels, the operator is enabled to very readily turn the machine at the ends of the rows by stepping to the rear of the machine which throws the front part of the machine up and allows the machine to turn readily. It will be seen that the balance of the machine is entirely under the control of the operator by shifting his weight to different parts of the machine. This machine harvests the vines, threshes them and throws the vines rearward while the peas or beans accumulate on the floor of the body. The runners are adjustable so that just the proper depression of the forward end of the body may be secured.

This machine has been found to be particularly effective for working under the peculiar conditions named at the beginning of this description, that is, working between rows of standing crops to harvest legume crops planted between the rows. By reason of the inclination of the members 15, the rows on either side of the row being harvested are forced away from the machine so that no harm is done to these standing crops. While I have illustrated a construction which has been found to be thoroughly effective for the purpose intended, I obviously do not wish to be limited to the details shown as these might be varied in many ways without departing from the spirit of the invention as defined in the appended claims.

I claim:—

1. A harvester of the character described, comprising a body, traction wheels upon which the body is mounted for tilting movement, the body having a bottom constituting an operator's platform and side walls, a knife bar mounted at the forward end of the body, means driven by the traction wheels for reciprocating the knife bar, a beater mounted immediately above the knife bar at the forward end of the body, and draft means pivotally connected to the forward end of the body, the tilting axis of the body being so disposed that the body is balanced whereby the operator may raise or lower the forward end of the body by shifting his weight on the platform forward or rearward of the tilting axis thereof.

2. A harvester of the character described, comprising a body having side walls and a bottom, traction wheels tiltably supporting the body, a reciprocating knife bar mounted at the forward end of the body, means connected to the traction wheels for reciprocating said knife bar, a beam extending across the forward end of the body and having upwardly extending pins, a beater rotatably mounted above said beam and carrying a plurality of transversely extending bars provided with projecting pins interdigitating with the pins on said beam, means connected to the traction wheels for rotating said beater, and a draft tongue pivotally connected to the forward end of the body.

3. A harvester of the character described, comprising a body having side walls and a bottom, traction wheels pivotally supporting the body, a reciprocating knife bar mounted at the forward end of the body, means connected to the traction wheels for reciprocating said knife bar, a beam extending across the forward end of the body and having upwardly extending pins, a beater rotatably mounted above said beam and carrying a plurality of transversely extending bars provided with projecting pins interdigitating with the pins on said beam, means connected to the traction wheels for rotating said beater, and a draft tongue pivotally connected to the forward end of the body, the forward end of the body having vertically adjustable runners.

4. A harvester of the character described, comprising a body having a bottom and side walls, traction wheels pivotally supporting the body, a frame attached to the body and including elements disposed exteriorly of the traction wheels but extending rearward and laterally, the forward end of said frame having a transversely extending beam extending across the forward end of the body and having upwardly extending pins, a reciprocating knife bar mounted upon the forward end of the body at its bottom, means connected to the traction wheels for reciprocating said knife bar, a shaft mounted in the body above the beam and having a beater comprising a plurality of radial arms and transversely extending bars, each of said bars having pins interdigitating with the pins on said beam, means connected to the traction wheel for driving said beater, a cage of wire netting extending over said beater, runners vertically adjustable upon the forward ends of the body, a tongue pivotally connected to the forward ends of the body and gathering members pivotally mounted upon the forward end of the body operatively supported by the tongue, the members extending downward and laterally.

5. In a harvester, a platform adapted to support an operator, traction wheels pivotally supporting the body midway of its length, a knife bar mounted upon the forward end of the platform, a tongue operatively pivoted to the forward end of the platform, a beater disposed above the knife bar, means connected to the traction wheels for driving the beater and reciprocating the knife bar, the platform being normally balanced forward and rearward upon the pivotal axis whereby the operator by shifting his weight on the platform may depress or raise the forward end of the platform forward or rearward of the pivotal axis.

6. A harvester of the character described, comprising a body having a platform or floor and side walls, traction wheels tiltably supporting the platform, a frame carried by the body and extending laterally beyond the wheels and having side members extending rearward and laterally, the frame including a cross beam extending across the front edge of the platform and having upwardly extending pins, a beater shaft mounted upon the side boards of the body above said beam and having radial arms and cross bars provided with pins intergitating with the pins on the beam, a sprocket wheel drive between the traction wheels and said shaft, a knife bar reciprocatingly mounted forward of said beam, a longitudinally extending crank shaft operatively connected to said knife bar, a bevel gear on said shaft, a stub shaft extending upward of the body and provided with a beveled gear engaging the first named beveled gear and carrying a sprocket wheel, a sprocket wheel on the beater shaft operatively engaged with the sprocket wheel on the stub shaft, a drive tongue pivotally connected to the sides of the body, the traction wheel axis being so disposed with reference to the platform that the platform is normally balanced whereby the operator by shifting his weight may depress or raise the forward end of the platform and runners mounted upon the forward end of the body and vertically adjustable whereby to limit the downward movement of the forward end of the platform under the weight of the operator.

7. A harvester of the character described, comprising a tiltable body, traction wheels upon which the body is mounted for tilting movement, the body having a bottom and side walls, and a knife bar mounted at the forward end of the bottom, means driven by the traction wheels for reciprocating the knife bar, a beater mounted above the knife bar at the forward end of the body, draft means pivotally connected to the forward end of the body and pick-up members attached to the forward end of the body extending downward and forward therefrom disposed one at each side of the body.

8. A harvester of the character described, comprising a tiltable body, traction wheels upon which the body is mounted for tilting movement, the body having a bottom and side walls, and a knife bar mounted at the forward end of the bottom, means driven by the traction wheels for reciprocating the knife bar, a beater mounted above the knife bar at the forward end of the body, draft means pivotally connected to the forward end of the body, and pick-up members attached to the forward end of the body extending downward and forward therefrom disposed one at each side of the body, the pick-up members having forwardly extending arms connected to the tongue whereby the pick-up member will be raised as the body is forced downward at its forward end.

9. A harvester comprising a platform, traction wheels tiltingly supporting the platform in a balanced condition, a cutter disposed at the forward end of the platform, a beater disposed above the cutter, and means disposed adjacent the forward end of the platform limiting downward movement of the forward end of the platform.

10. In a harvester of the character described, a body open at its forward end, wheels supporting the body, a knife bar mounted on the body, a beater disposed above the knife bar and gathering members mounted on the forward end of the body forward of the knife bar and extending downward and forward.

11. In a harvester of the character described, a body open at its forward end, means supporting the body intermediate of its ends in a balanced condition, a knife bar at the forward end of the body, a beater disposed above the knife bar, and means whereby the forward end of the body may be raised or lowered to bring the knife bar nearer to or further from the ground.

In testimony whereof I hereunto affix my signature.

JOHN F. HAAG.